United States Patent [19]

Bielaczek

[11] 4,176,716
[45] Dec. 4, 1979

[54] METHOD AND APPARATUS FOR TAPPING GROUNDWATER

[75] Inventor: Herbert Bielaczek, Frankfurt-Sossenheim, Fed. Rep. of Germany

[73] Assignee: Robert Brehm, Grainau, Fed. Rep. of Germany; a part interest

[21] Appl. No.: 814,773

[22] Filed: Jul. 11, 1977

[30] Foreign Application Priority Data

Jul. 14, 1976 [DE] Fed. Rep. of Germany ....... 2631642
Dec. 30, 1976 [DE] Fed. Rep. of Germany ....... 2659588

[51] Int. Cl.$^2$ .................. E21B 43/00; E21B 49/02
[52] U.S. Cl. .................. 166/254; 166/68.5; 175/20; 175/22
[58] Field of Search ............. 166/253, 68.5, 254, 166/68, 230, 314; 175/20, 22, 23, 58, 314

[56] References Cited

U.S. PATENT DOCUMENTS

| 313,521 | 3/1885 | Powers | 175/22 |
|---|---|---|---|
| 507,018 | 10/1893 | Lacy, Jr. | 175/20 |
| 572,860 | 12/1896 | Brearley | 175/394 |
| 757,124 | 4/1904 | Kampfe | 175/314 X |
| 767,209 | 8/1904 | Decker | 175/314 X |
| 923,371 | 6/1909 | Palmer et al. | 175/314 X |
| 975,020 | 11/1910 | Coplen | 175/20 |
| 997,191 | 7/1911 | Hogarth | 166/230 X |
| 2,342,913 | 2/1944 | Williams et al. | 166/230 X |
| 2,654,434 | 10/1953 | Culleton | 166/68.5 |
| 3,596,719 | 8/1971 | Koziski | 175/20 |
| 3,873,238 | 3/1975 | Elfarr | 166/68 X |

FOREIGN PATENT DOCUMENTS

| 189982 | 10/1907 | Fed. Rep. of Germany | 175/20 |
|---|---|---|---|
| 365878 | 3/1921 | Fed. Rep. of Germany | 175/314 |
| 458384 | 10/1913 | France | 175/20 |
| 3074 | of 1865 | United Kingdom | 175/314 |

*Primary Examiner*—Stephen J. Novosad
*Attorney, Agent, or Firm*—Michael J. Striker

[57] ABSTRACT

A method of tapping groundwater and an apparatus therefor are disclosed. A probe is driven to a water bearing stratum to determine the depth thereof. Then a riser tube is driven to the thus determined depth and a riser conduit with a foot valve is lowered into the riser tube, whereupon a suction-producing device, (e.g. pump) is connected to the upper end of the conduit.

5 Claims, 5 Drawing Figures

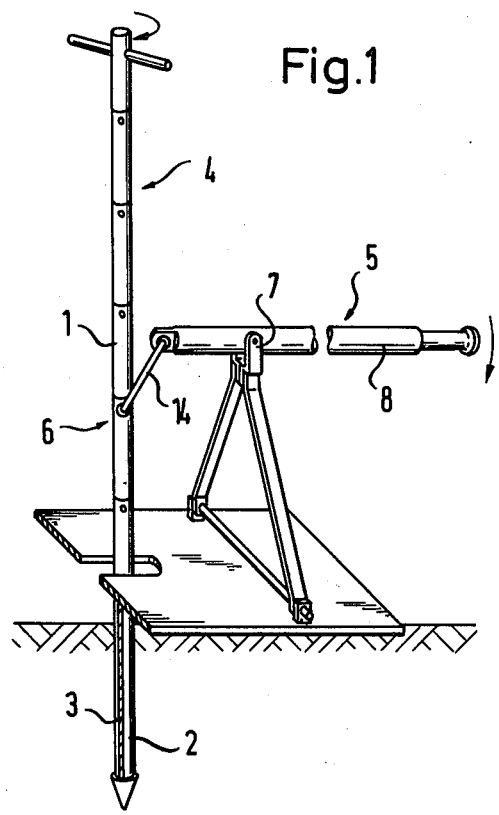
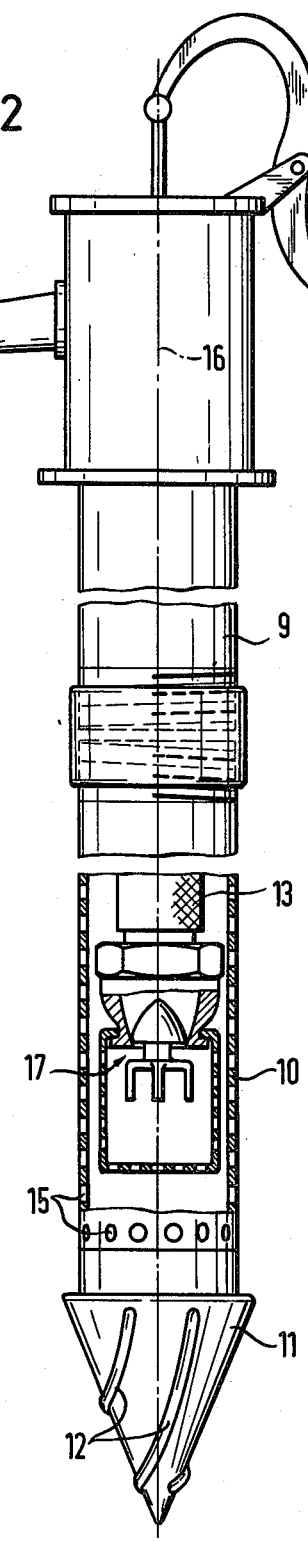

4,176,716

METHOD AND APPARATUS FOR TAPPING GROUNDWATER

BACKGROUND OF THE INVENTION

The present invention is concerned with the tapping of groundwater, and more particularly with a method and apparatus for this purpose.

The invention is not directed to deep wells, i.e. those having a depth which is usually in excess of thirty or forty meters. Instead, the invention is concerned with shallow wells, i.e. those deriving their water from water-bearing ground strata up to a depth of about ten meters, i.e. from essentially the upper water-bearing strata.

Such shallow wells are, of course, well known. To produce them it is widely customary to ram a pointed metal (usually iron) tube into the ground and to apply suction to the tube so as to draw water up through the same. The problem with these wells is that there is no way of knowing just how deep the point of the tube must be inserted into the ground to assure its optimal positioning with reference to the water-bearing stratum. Also, the actual manufacture is rather expensive and since the entire well system (i.e. including the pump and conduits) is subject to suction such wells tend to fill up quite quickly and become completely or partially disfunctional.

SUMMARY OF THE INVENTION

It is therefore an object of the invention to avoid the prior-art disadvantages.

A more particular object is to provide a novel method and apparatus for tapping upper groundwater-bearing strata, which are not subject to these disadvantages.

A concomitant object is to provide such a method and apparatus, which are inexpensive to employ and to manufacture, respectively.

Another object is to assure that the water-receiving component or portion of the apparatus will reliably become located in the water-bearing stratum.

Still an additional object is to eliminate the dange of filling.

Pursuant to these objects and still others, one aspect of the invention resides in a method of tapping groundwater. Briefly stated, this method comprises inserting a probe into the ground and taking soil samples until a water-bearing stratum has been located; thereupon sinking a riser tube into the soil to the water-bearing stratum, and inserting water-conveying means into the riser tube.

The water-conveying means may comprise an element with a foot valve, such as a hose or conduit of metallic or non-metallic (e.g. rubber, synthetic plastic) material. It may also comprise suction means, such as a pump or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a diagrammatic perspective, showing a probe and associated equipment according to the invention;

FIG. 2 is a partially section side elevation of a pump embodying the invention;

DESCRIPTION OF THE PREFERRED EMBODIMENTS

The invention will hereafter be described conjointly as to its method and apparatus aspects.

Figure 5:
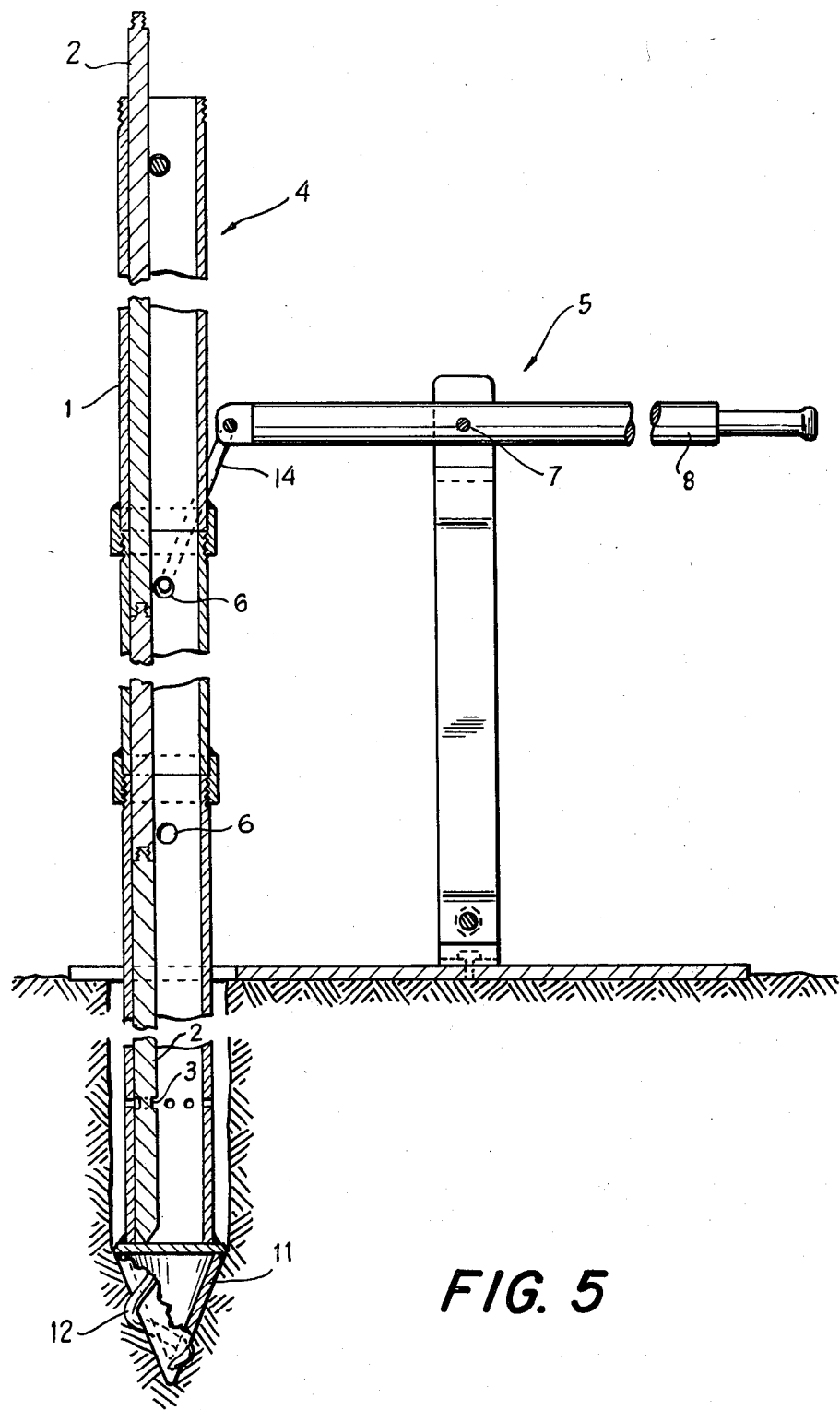
FIG. 5 is a vertical section through the apparatus of FIG. 1.

FIGS. 1 and 5 show that according to the invention a tubular probe 4 having a guide rod 2 is successively driven into the ground by turning it and applying axially acting impacts to it (usually to its trailing end). From time to time the guide rod 2 is withdrawn through the tubular probe 4; it is provided with a groove 3 in which soil accumulates. On withdrawal of the guide rod the accumulated soil is inspected for signs of moisture to determine the soil characteristics and, to determine whether a water-bearing stratum has been reached. If no signs of moisture are found the rod 2 is reinserted and driving of the probe 4 resumes. A number of extension rods 1 (similar to the rod 2)—the number depends upon the depth to be reached—is mounted on rod 2 and these rods 1 (shown in FIG. 1 by a dotted line) are rigidly connected with each other and with the rod 2. Thus, a depth of ten meters or more can be reached, if and as needed. On the average a time of about 30-60 minutes has been found adequate for driving of the probe 4 and rod 2 to maximum depth.

When a water-bearing stratum is found (or if none is found within the intended depth) the probe 4 must be withdrawn from the ground for reuse. This is accomplished by means of the extracting mechanism 5 having e.g. the illustrated plate on which upright arms are mounted (as shown). A lever 8 is pivoted to the arms at 7 and its front end is provided with engaging members 14 (one shown, but there may be more) which can be successively connected to and disconnected from the bosses, recesses or the like 6 on probe 4, as the latter emerges from the ground. The lever 8 is pivoted (see the arrow) until the probe 4 has been extracted to the maximum possible extent for the given stroke; thereupon members 14 are disconnected from the probe 4, the lever 8 is lowered and members 14 are reconnected to a lower portion of the probe. This continues until the probe 4 is extracted.

Instead of the illustrated bar-shaped members 14 whose end portions are angled-off and extend into the bores 6, other elements could also be used. In particular, self-locking elements can be employed which automatically engage the probe when the lever 8 is pivoted upwardly and automatically release the probe (and slide downwardly along it) when lever 8 is pivoted downwardly. This eliminates the need for manually disengaging and reengaging the member 14. Any and all suitable elements can be used however.

FIG. 2 shows a riser tube 9 which is composed of individual pipe lengths (each e.g. one meter long) that are threaded or otherwise secured together. The lower end of riser tube 9 has a water-intake and filter portion 10, and forwardly of the same a drilling tip 11 provided with guide ribs or guide grooves 12 which are inclined to the longitudinal axis 16 of the riser tube 9. These guide elements—here welded-on sheet-metal ribs or fins—assure that when the riser tube 9 is pounded into the ground—preferably into the hole previously made by the (now extracted) probe 4—the tube 9 also performs turns (i.e. rotates) as the ribs 12 "thread" themselves into the ground. This greatly facilitates the sinking (inserting) of the tube 9.

Once the tube 9 has been sunk to the water-bearing stratum (i.e. the depth at which the presence of water was indicated by the probe 4) water-conveying means are inserted into the tube, in accordance with the invention. Such means comprise an element 13 (e.g. a pipe, hose or tube of metal or synthetic plastic material). Its lower end carries a foot valve 17 which admits water into the tube but prevents it from flowing out again. If, now, suction is produced at the upper end of tube 13, as diagrammatically illustrated in FIG. 2, then the water which has entered through the filter portion 10 (prevents entry of sand, etc.) is aspirated upwardly. The suction acting within the confines of filter portion 10 does not (or at most barely so) act beyond these confines so that no sand or other particles are drawn against the openings of the filter portion 10 to clog the same.

The effect can, incidentally, be further enhanced if the filter portion is provided in the tip 11, because this eliminates any lateral propagation of the suction, or if a sleeve is placed with radial spacing about the filter portion 10 (or at least about that part thereof where the strongest suction acts).

That part of the apparatus, especially the tube 9, which extends upwardly out of the ground, should be provided with at least one air hole. This is advisable because, if not enough water collects within the filter portion 10 and increased suction results thereby, then air will be aspirated through the air hole and the excessive suction will thereby be reduced.

The invention offers a variety of advantages. The apparatus itself is inexpensive and simple. The suction system can be readily replaced or pulled out for cleaning and inspection, the available water in the well will be utilized 100%, the depth at which the water-bearing stratum is located (and to which the tube 9 must be sunk) can be determined with precision (accurate to the centimeter). Moreover, the connection between the individual rods need not be air-tightly sealed. The driving of a well and installation of a pump, utilizing the invention, has been found to require no more than 2–3 hours in most instances.

The probe may have an outer diameter of about 20–25 mm, and the corresponding dimension of the tube 9 may be about 70–80 mm. However, these sizes are intended only as examples and are in no way to be considered limiting.

Utilizing the invention a well can be sunk, and a pump installed, by personnel having had no more than one or two days' instructions. There is no need to dig a well shaft and support its sides by masonry or by a concrete cladding. The invention can, of course, be used in conjunction with an already existing well shaft; all that is required is to lower the tube 9 and tube 13 into the shaft and install a suction device at their upper ends.

The foot valve on tube 13 should usually be lowered to the lowermost end (or even beyond the same) of the filter portion 10 to obtain the best results. No special large drill rigs are required to drive the tube 9, so that the necessary tools can be readily taken even to tight spaces, e.g. through narrow doors. A conventional ram can be used, connected to a rope which runs over a pulley mounted e.g. on the upper end of a folding ladder, so that an operator alternately pulls on the rope to raise the ram and releases the rope for the ram to drop into the upper end of tube 9. The same operation can of course also be performed (earlier) with the probe 4. Whenever the trailing end of the tube 9 comes close to ground, another extrusion tube or section is threaded to it to extend its length.

Figure 3:
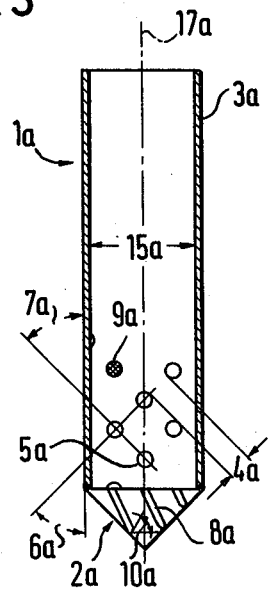
FIG. 3 is a vertical section, showing a filter according to the invention.

FIG. 3 shows the leading section 3a of the tube 9. It is emphasized that the sections are seamless tubes of a high-strength steel. Their wall thickness will be selected in dependence upon the expected stresses during driving; this can be readily determined by those skilled in the art. Section 3a has holes 5a (in the filter portion 10) which are so arranged as not to detract from the overall strength of the section 3a. The distance 4a between the closest points of adjacent holes 5a should advantageously be at least equal to the diameter of the holes 5a.

Figure 4:
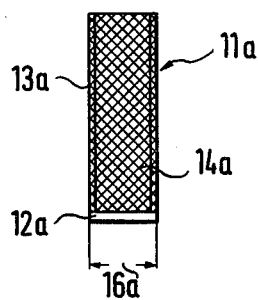
FIG. 4 is a side elevation showing a component of the arrangement.

Each of the holes 5a may have filter cloth associated with it. This could be a cylinder welded or soldered to the tube section 3a at one or both ends of the cylinder. As FIG. 4 shows the cloth can however be most simply provided by utilizing a tubular filter-cloth insert 11a (of e.g. wire cloth, synthetic plastic screening or the like) composed of filter cloth 14a having an outer surface 13a. One or both ends may be reinforced by a ring 12a which can simply be frictionally inserted into the insert 11a, by making its outer diameter 16a the same as or only very slightly smaller than, the inner diameter of the insert 11a. Alternately, the diameter 16a can be made just slightly smaller than the inner diameter 15a of tube section 3a, so that the ring 12a will be located at the end of insert 11a but not received in it.

Referring to FIG. 3, it is important that the angle 7a (relative to the axis 17a of section 3a) may be freely selected as desired. Advantageously, it should be between 15° and 75°, and 45° is preferred.

However, the holes 5a could be arranged in rows about the section 3a, with the bores of each row being located in a common horizontal plane. The arrangement of the bores in successive rows should be such that they include an angle of 90° with the axis 17a.

The driving of the tube 9 is greatly facilitated by the ribs or fins 8a in FIG. 3 (correspond to ribs or fins 12 in FIG. 1). The turning movement resulting from their presence facilitates the penetration of even relatively hard soil strata. The angle 10a at the tip (FIG. 3) should, incidentally, be selected with the turning and penetrating requirement in mind; advantageously it will be between about 10° and 60° relative to the axis 17a.

While the invention has been illustrated and described as embodied in a shallow-well pump installation, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A method of sinking a shallow well and installing a pump therein, comprising the steps of sinking a probe into the ground, said probe being formed with means for accumulating soil; periodically extracting the probe from ground during its progressive sinking for examining successive soil samples until a water bearing stratum has been located and its depth determined; thereafter driving a riser tube into the ground to the previously determined depth; installing in the riser tube a water conveying conduit having a foot valve; and installing in the region of an upper end of the riser tube suction means which communicate with the conduit to aspirate water through the same.

2. A method as defined in claim 1; wherein the step of driving comprises forcibly inserting the riser tube into the hole previously occupied by the probe.

3. A method as defined in claim 1, wherein the step of driving comprises subjecting a trailing end of the riser tube to axially acting impacts and causing turning of the riser tube about the longitudinal axis thereof.

4. In a combination for sinking a shallow well, an apparatus comprising a tubular probe composed of a plurality of longitudinally connectable sections and having a leading end adapted to be driven downwardly into the ground; and a guide rod movably mounted on said probe for movement therewith into the ground and displaceable relative to said probe for movement relative thereof, said rod having a portion located in the region of said leading end and provided with at least one soil-accumulating recess so that soil accumulated in said recess can be inspected for moisture traces when the rod is displaced upwardly and relatively to said probe which is meanwhile stationary in the ground.

5. In a combination as defined in claim 4; and further comprising means for extracting said probe from the ground upon completion of the ground inspection.

* * * * *